United States Patent
Huang

(10) Patent No.: US 6,663,266 B2
(45) Date of Patent: Dec. 16, 2003

(54) LIGHTING FIXTURE FOR OPTIONALLY POSITIONING LAMP DEVICE

(76) Inventor: Nan-Jung Huang, 3F, No. 10, Ton-San, St., Shin-Chu (TW)

(*) Notice: Subject to any disclaimer, the term of this patent is extended or adjusted under 35 U.S.C. 154(b) by 0 days.

(21) Appl. No.: 10/144,050

(22) Filed: May 9, 2002

(65) Prior Publication Data

US 2003/0210553 A1 Nov. 13, 2003

(51) Int. Cl.[7] ............................................. F21V 21/18
(52) U.S. Cl. ......................... 362/402; 362/33; 362/427
(58) Field of Search ................................ 362/402, 401, 362/427, 449, 391, 396, 413, 418, 33; 248/162.1, 280.11, 594, 578

(56) References Cited

U.S. PATENT DOCUMENTS 4,744,019 A  *  5/1988  Krogsrud ..................... 362/402

* cited by examiner

*Primary Examiner*—Sandra O'Shea
*Assistant Examiner*—Bao Truong

(57) ABSTRACT

A lighting fixture includes a supporting device clamped or standing on a table or surface; a main arm pivotally mounted on the supporting device; a cantilever pivotally secured to the main arm; a lamp device having a lamp and a lamp shade pivotally connected to the cantilever; and a linear restoring spring set resiliently retained between the supporting device and an adapter secured at a distal (outer) end portion of the cantilever for securing the lamp device with the adapter, with the linear restoring spring set linearly concealed and built in the cantilever and the main arm for forming a compact appearance of the lighting fixture and for statically balancing the weight of the lamp device in order for optionally positioning the lamp device at a desired orientation or position.

2 Claims, 3 Drawing Sheets

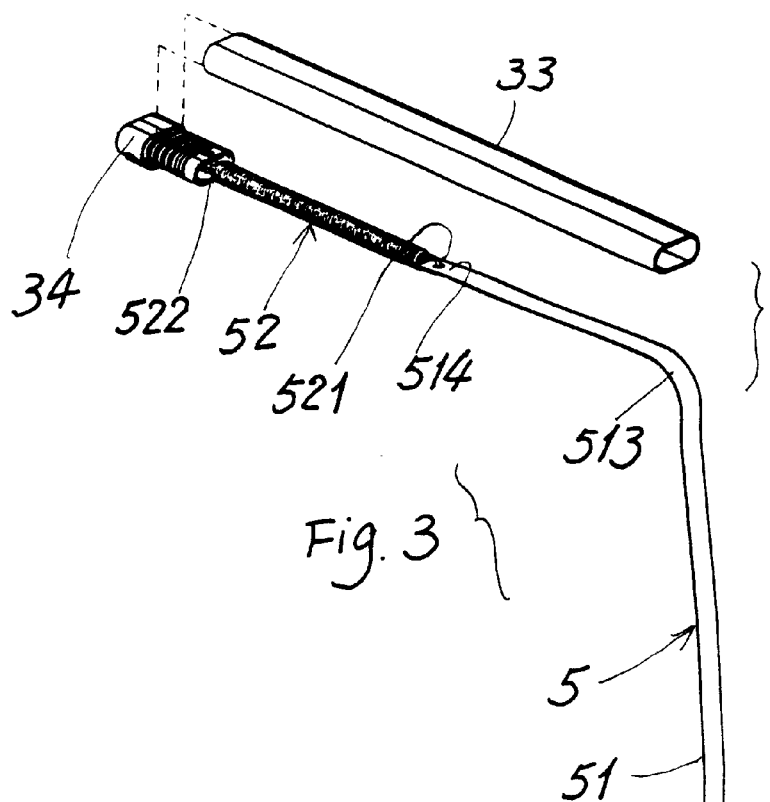
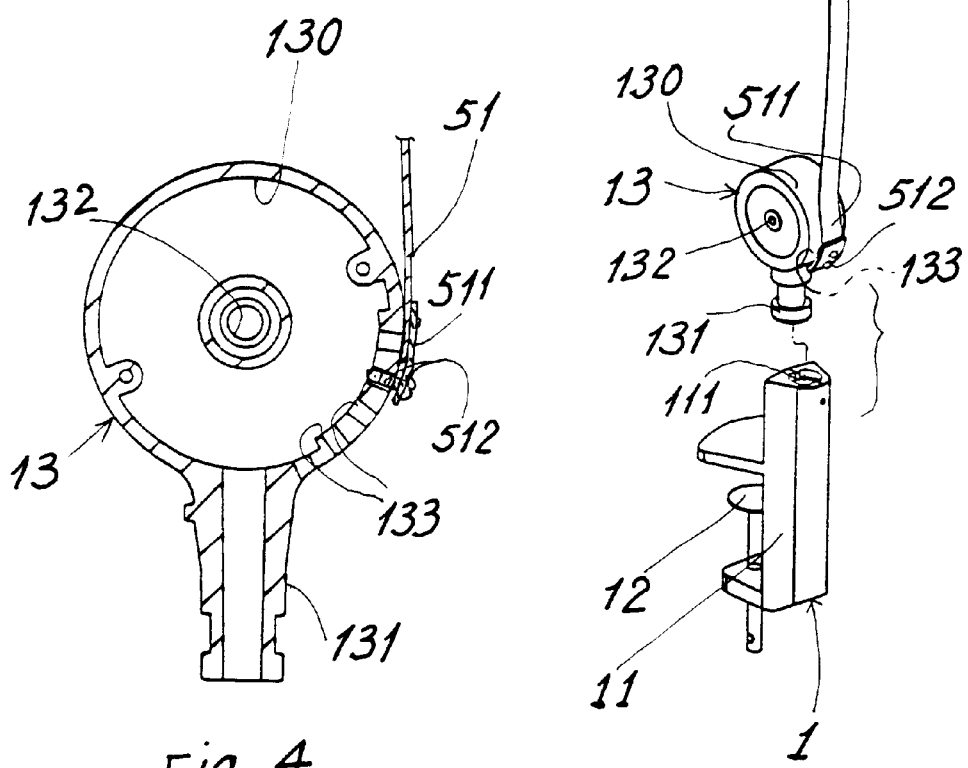

LIGHTING FIXTURE FOR OPTIONALLY POSITIONING LAMP DEVICE

BACKGROUND OF THE INVENTION

A conventional lighting fixture may be provided with a plurality of helical springs connected among plural links which are pivotally secured between a lamp shade (with lamp) and a stand. Upon a telescopic movement of the links of the lighting fixture, the lamp may be optionally fixed at a desired position as resiliently tensioned by the plural helical springs. However, such a conventional lighting fixture has the following drawbacks:

1. The plural helical springs are externally connected among the links of the lighting fixture without being concealed or built in a frame or stand, thereby affecting an ornamental appearance of the lighting fixture.
2. So many such helical springs as provided on the lighting fixture may increase the total volume of the lighting fixture, thereby causing inconvenience for use, storing and handling thereof.
3. Many accessories including brackets or retainers should be provided for mounting the plural helical springs on the lighting fixture, thereby increasing the assembly complexity and production cost.
4. The springs, as externally installed, may be loosened or released from the fixture after long-time use to easily injure the user. The present inventor has found the drawbacks of the conventional lighting fixture and invented the present lighting fixture for optionally positioning lamp device.

SUMMARY OF THE INVENTION

The object of the present invention is to provide a lighting fixture including a supporting device clamped or standing on a table or surface; a main arm pivotally mounted on the supporting device; a cantilever pivotally secured to the main arm; a lamp device having a lamp and a lamp shade pivotally connected to the cantilever; and a linear restoring spring set resiliently retained between the supporting device and an adapter secured at a distal (outer) end portion of the cantilever for securing the lamp device with the adapter, with the linear restoring spring set linearly concealed and built in the cantilever and the main arm for forming a compact appearance of the lighting fixture and for statically balancing the weight of the lamp device in order for optionally positioning the lamp device at a desired orientation or position.

BRIEF DESCRIPTION OF THE DRAWINGS

FIG. 3 is an exploded view of the major elements of the present invention.

FIG. 4 is a sectional drawing of partial supporting device of the present invention.

DETAILED DESCRIPTION

Figure 1:
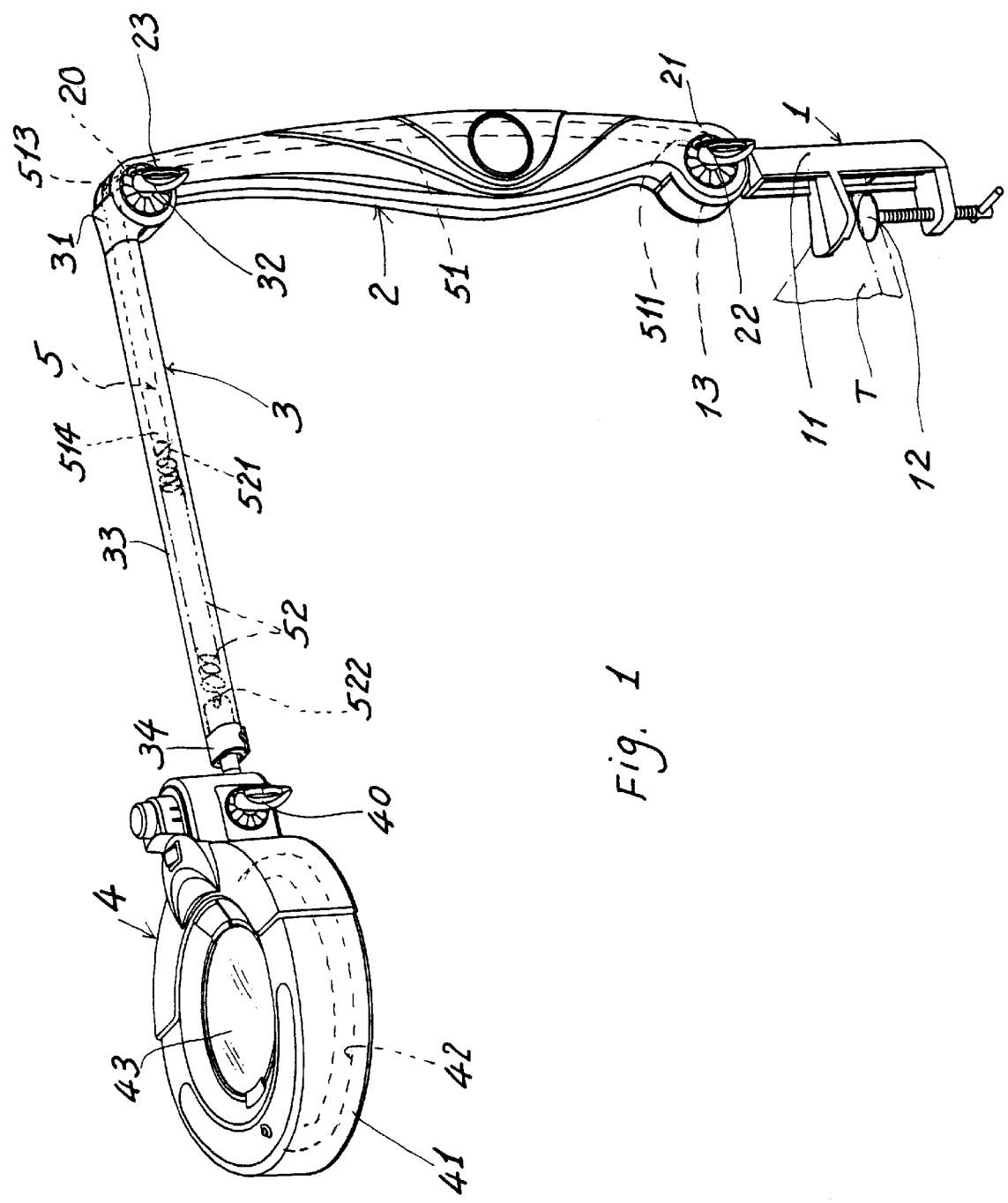
FIG. 1 is a perspective view of the present invention.

As shown in the drawing figures, the present invention comprises: a supporting device 1, a main arm 2 pivotally mounted on the supporting device 1, a cantilever 3 pivotally secured to the main arm 2, a lamp device 4 pivotally connected to the cantilever 3, and a linear restoring spring set 5 linearly retained between the supporting device 1 and an outer end portion of the cantilever 3 adjacent to the lamp device 4.

The lamp device 4 includes: a lamp shade 41 (or lamp casing); a lamp 42 which may be a fluorescent lamp, a bulb or an illuminator, not limited in the present invention; a magnifier or magnifying lens 43 mounted in the shade 41 for magnifying the optical image when illuminated by the lamp 42; and a knob 40 rotatably mounted through the lamp device 4 and on a connector or adapter 34 connected to cantilever for pivotally or angularly fastening the lamp device 4 to cantilever 3.

The supporting device 1 includes: a base 11 having a clamp, a fastener or a vise 12 adapted to be clamped on a table T or a surface or any object, and a spool 13 mounted on the base 11 for adjustably fastening a proximal (or inner or lower) end portion of the linear restoring spring set 5 on the spool 13 of the supporting device.

Naturally, the supporting device 1 may be modified or simplified to be a stand which can be laid on a table or floor surface, not limited in the present invention.

The main arm 2 may be formed by combining two half shells or semi covers to be an enclosed arm member for encasing the spring set 5 therein. The shape and structure of the arm 2 are not limited in the present invention. The decorative feature on the arm 2 as shown in FIG. 1 is just for illustration purpose, also not limited in this invention.

The main arm 2 (or main frame) includes: a base pivotal portion 21 adjacent to the supporting device 1 and pivotally secured on the spool 13 of the supporting device 1, an arm knob 22 rotatably coupled on the spool 13 of the supporting device 1 for fastening the arm 2 on the supporting device and upon an angular adjustment of the arm 2 with respect to the supporting device 1, the arm knob 22 is locked to deadly fix the arm 2 with the supporting device 1 at the desired orientation or angle, and a distal (or outer) end portion 23 of the arm 2 pivotally connected with the cantilever 3 as locked by a cantilever knob 32.

Figure 2:
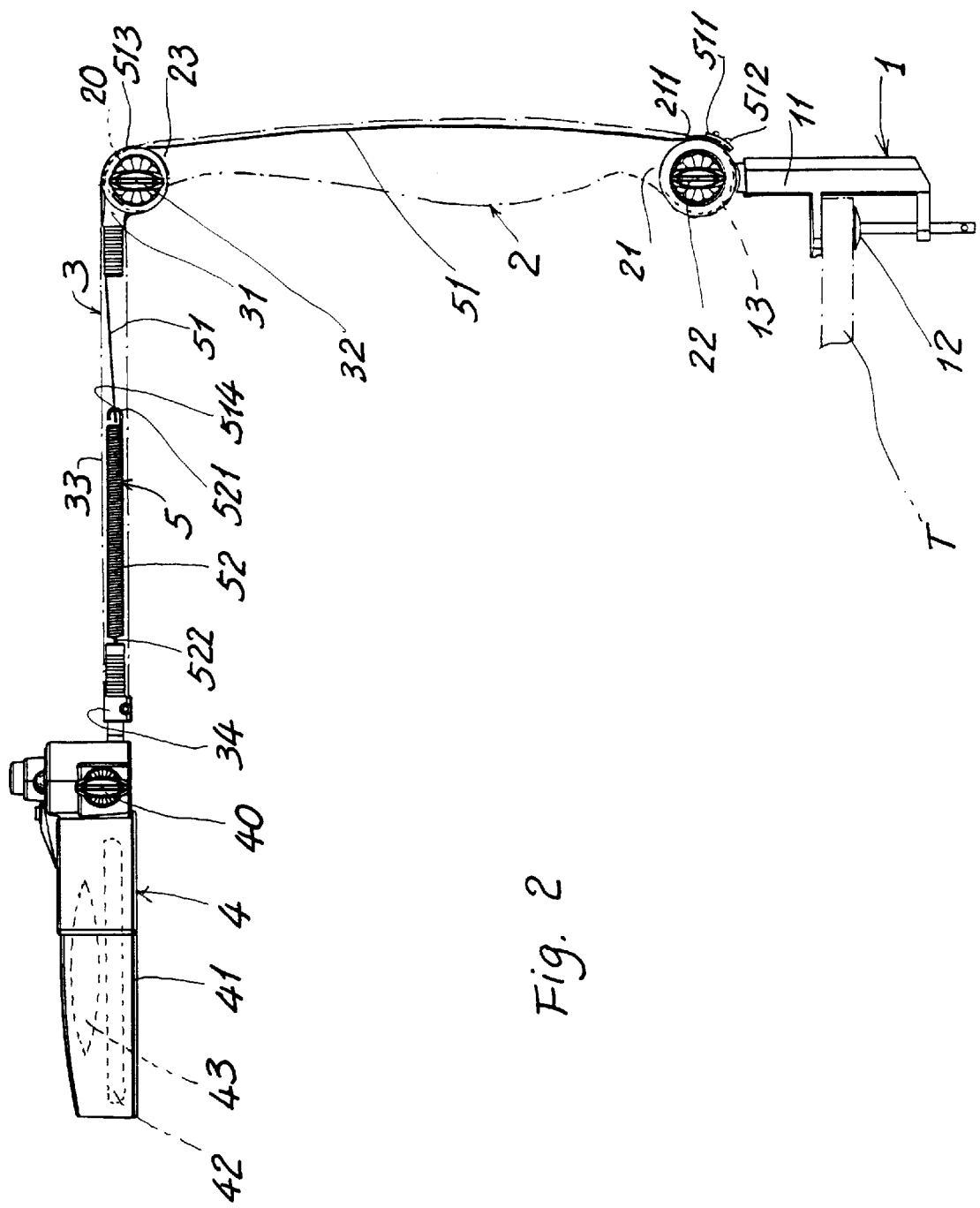
FIG. 2 is a front view illustration of the present invention.

The base pivotal portion 21 is cut out with a notch 211 for adjustably fastening the lower (or proximal) end portion of the spring set with the supporting device 1 (FIG. 2).

The cantilever 3 includes: an inner pivotal portion 31 rotatably mounted on the distal end portion 23 of the main arm 2 and locked by a cantilever knob 32 which is rotatably coupled with the distal end portion 23 of the arm 2 and with the inner pivotal portion 31, a sleeve member 33 secured to the inner pivotal portion 31, and an adapter 34 fixed on an outer end portion of the sleeve member 33 for connecting the lamp device 4 with the adapter 34 and with the cantilever 3.

The main arm 2 and the cantilever 3 may also be integrally formed by those having skill in the art and the linear spring set 5 is concealed or built in the main arm 2 combined with the cantilever 3 as connected between a stand and the lamp device 4.

The linear restoring spring set 5 includes: a restoring spring plate 51 formed as an elongate plate member having a proximal (or lower or inner) end portion 511 secured on the supporting device 1, and a distal (or outer or upper) end portion 514; and a helical tension spring 52 having an inner spring end 521 secured with the distal end portion 514 of the restoring spring plate 51 and an outer spring end 522 secured to an adapter 34 formed on an outer end portion of the cantilever 3 adjacent to the lamp device 4; with the restoring spring plate 51 connected with the helical tension spring 52 to be linearly built in (concealed) in an interior in the main arm 2 and in the cantilever 3 and having a bending portion 513 formed on an intermediate portion of the restoring spring plate 51 as slidably engaging on a shaft (or hub) 20 transversely formed in the distal portion 23 of the main arm 2.

The helical tension spring 52 and an outer portion of the restoring spring plate 51 are linearly built in the sleeve member 33 of the cantilever 3. The inner (or lower) portion of the spring plate 51 is built in the main arm 2. Therefore, the linear spring set 5 is completely concealed in the arm 2 and cantilever 3 for forming a compact lighting fixture having better ornamental effect.

The inner spring end 511 of the spring plate 51 is adjustably fixed on the spool 13 of the supporting device 1 by a screw 512 (or bolt) which is selectively engaged in one of a plurality of screw holes 133 circumferentially formed in a periphery 130 of the spool 13 which includes a connector 131 fixed in the base 11 of the supporting device 1 and an axial hole 132 for engaging an arm knob 22 with the axial hole 132 for rotatably coupling the arm knob 22 with the spool 13 of the supporting device 1.

Since the inner spring end 511 of the spring plate 51 may be adjustably fixed on the periphery of the spool 13, the linear restoring spring sets 5 having different lengths may be selectively fixed on the supporting device 1 in accordance with the present invention. Meanwhile, for serving as a buffer or allowance for properly accommodating the spring set 5 in the arm 2 and the cantilever 3, the inner spring end 511 can be adjustably fixed on the spool periphery 130 for satisfying the convenience of assembly, operation and maintenance of the lighting fixture. For instance, a "shorter" spring plate 51 may have its inner end 511 fixed on an "upper" screw hole 133 formed in the spool 13; while a "longer" spring plate having its spring end 511 fixed to a "lower" screw hole in the spool, thereby helping the production flexibility or solving the quality control problem.

The inner portion 21 of the main arm 2 may be cut out with a notch 211 to reveal partial periphery 130 of the spool 13 for conveniently adjustably fixing the spring end 511 on the spool 13.

The helical tension spring 52 of the linear restoring spring set 5 can be resiliently extended to balance the weight of the lamp device 4 as suspended and secured on the end of the cantilever 3; while the restoring spring plate 51 of the linear restoring spring set 5 may help restore the cantilever 3 and arm 2 during the movable adjustment of the "linkage" of the cantilever 3 and the arm 2 when selectively adjusting the positioning of the lamp device 4 for a comfortable illumination.

The resilience of the tension spring 52 and the spring plate 51 may help a stable force-balanced positioning of the lamp device 4. Nevertheless, the complete linear restoring spring set 5 is "concealed" in the interior in the arm 2 and cantilever 3 without requiring further space for accommodating the linear restoring spring set 5 to thereby form a compact appearance of the lighting fixture.

The present invention may be modified without departing from the spirit and scope of the present invention.

I claim:

1. A lighting fixture comprising: a supporting device; a main arm pivotally mounted on the supporting device; a cantilever pivotally secured to the main arm; a lamp device including a lamp and a magnifying lens formed in a lamp shade and pivotally connected to the cantilever; and a linear restoring spring set resiliently retained between the supporting device and an adapter secured with the cantilever and the lamp device; with the linear restoring spring set linearly built in the cantilever and the main arm for forming a compact appearance of the lighting fixture and for statically balancing the weight of the lamp device in order for optionally positioning the lamp device at a desired position; and said linear restoring spring set including: a restoring spring plate formed as an elongate plate member having a proximal end portion secured on the supporting device, and a distal end portion; and a helical tension spring having an inner spring end of the tension spring secured with the distal end portion of the restoring spring plate and an outer spring end of the tension spring secured to the adapter formed on an outer end portion of the cantilever adjacent to the lamp device; with the restoring spring plate connected with the helical tension spring to be linearly built in an interior in the main arm and in the cantilever and having a bending portion formed on an intermediate portion of the restoring spring plate as slidably engaging on a shaft which is transversely formed in a distal portion of the main arm pivotally connected with said cantilever.

2. A lighting fixture according to claim 1, wherein said inner spring end of the spring plate is adjustably fixed on a spool of the supporting device by a screw which is selectively engaged in one of a plurality of screw holes circumferentially formed in a periphery of the spool fixed in a base of the supporting device.

* * * * *